P. BEECHEL.
PROTECTOR FOR CREAM SEPARATORS.
APPLICATION FILED FEB. 20, 1909.
963,500.
Patented July 5, 1910.
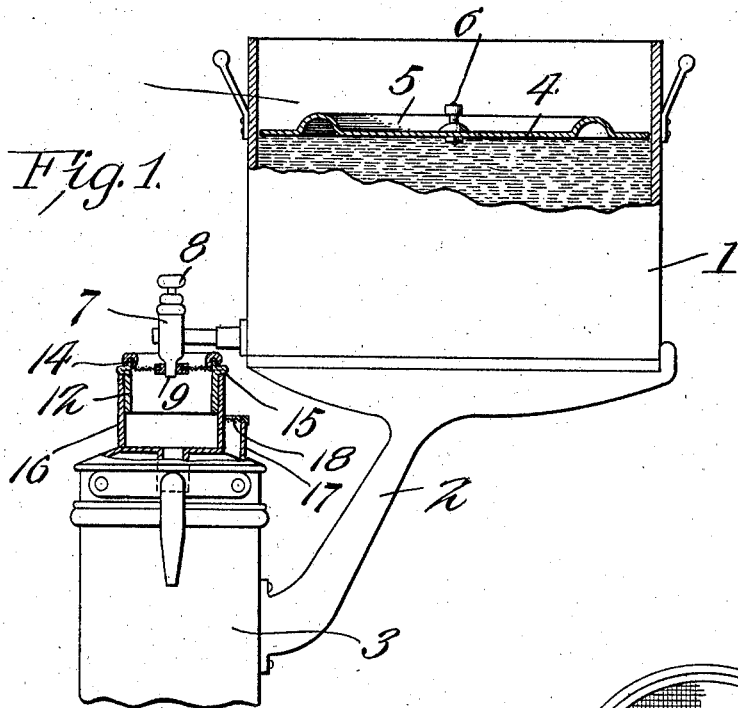
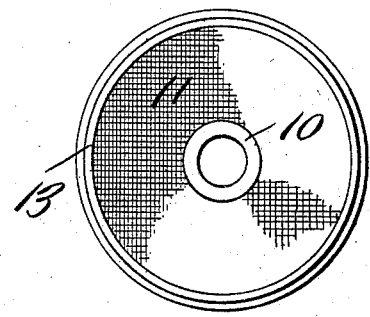
Witnesses
C. E. Smith.
K. Allen
Inventor
Phillip Beechel,
By Victor J. Evans
Attorney

UNITED STATES PATENT OFFICE.

PHILLIP BEECHEL, OF FAIRFAX, SOUTH DAKOTA.

PROTECTOR FOR CREAM-SEPARATORS.

963,500.  Specification of Letters Patent.  Patented July 5, 1910.

Application filed February 20, 1909. Serial No. 479,061.

*To all whom it may concern:*

Be it known that I, PHILLIP BEECHEL, a citizen of the United States, residing at Fairfax, in the county of Gregory and State of South Dakota, have invented new and useful Improvements in Protectors for Cream-Separators, of which the following is a specification.

This invention relates to cream separators, and the object of the invention is to provide simple and effective devices which will prevent the entrance of insects or other obnoxious material to the container or milk receptacle during the process of separating the cream from the milk.

With these objects in view the invention resides in the novel construction of elements and their arrangement in operative combination, hereinafter fully described and claimed.

In the accompanying drawings, Figure 1 is a side elevation, partly in section, of the upper portion of the cream separator showing the improvement in applied position thereon. Fig. 2 is a top plan view of the screen provided for the milk receptacle.

In the accompanying drawings the numeral 1 designates the milk receptacle or container. This container 1 is of the usual cylindrical construction and is supported upon an arm 2 secured upon the chamber 3 of the cream separator. The container 1 is provided with a float 4. This float 4 is constructed of some suitable light material and is of a contour corresponding with the shape of the inner walls of the container 1. The float is adapted to fit snugly within the container so as to prevent the entrance of flies or other insects between the edges of the float and the inner walls of the container. The float 4 is provided with an annular raised portion 5 adapted to serve as an air receptacle whereby the float is effectively retained upon the upper surface of the milk within the container. The float 5 is also provided with a suitable handle or knob 6, by which it may be readily positioned within or removed from the container as desired.

The container 1 is provided with the usual outlet cock 7 adapted to be operated by a suitable handle or knob 8. The cock 7 is provided with the usual reduced outlet mouth 9, and this mouth 9 is adapted to be snugly positioned within a centrally arranged ring 10 carried by a gauze top 11 positioned upon a collar 12 provided upon the milk receptacle 3. The gauze top 11 has its outer periphery provided with a U-shaped flange 13, and this flange 13 is adapted to engage a projection 14 provided upon the collar 12. The collar 12 is also provided with an annular offset 15 by which it is retained upon the top of a cap 16 provided upon the upper portion of the milk receptacle 3. This cap 16 comprises a body portion having its lower edge flared outwardly and continued downwardly to provide an annular ring by which it is frictionally secured upon the cream separator 3. The cap 6 is also provided with a tubular projection 17 positioned upon one of its sides and communicating with its open mouth. The tube 17 is provided with a suitable gauze covering 18 which is adapted to serve as an air inlet to the milk within the receptacle 3.

From the above description it will be seen that I have provided an ordinary cream separator with simple and effective devices whereby the entrance of insects or trash to the milk or cream is effectively obviated.

While I have described the preferred embodiment of my invention as it now appears to me, it is to be understood that minor details within the scope of the following claims may be resorted to without departing from or sacrificing any of the spirit of the invention.

Having thus fully described the invention what is claimed as new is:

1. The combination of a milk separator comprising a container and a receptacle, and a gauze top provided with a ring for the milk receptacle, said ring adapted to engage the mouth of the outlet cock of the container.

2. The combination of a milk separator comprising a container and a receptacle, a collar engaging the inner perimeter of the upper portion of the receptacle, said collar being provided with an annular flange and a projecting portion, a U-shaped ring engaging the projecting portion, a reticulated cover for the ring, a smaller ring also engaging the reticulated cover, and said smaller ring adapted to engage the mouth of the outlet cock of the container.

In testimony whereof I affix my signature in presence of two witnesses.

PHILLIP BEECHEL.

Witnesses:
 W. A. DAVIS,
 CHARLES A. DAVIS.